US012792243B2

(12) United States Patent
Felicioli et al.

(10) Patent No.: US 12,792,243 B2
(45) Date of Patent: Nov. 10, 2026

(54) CRYPTOGRAPHY-BASED TIME RELATIONSHIPS IN AND BETWEEN VERIFIABLE PERSISTENT LEDGER STRUCTURES

(71) Applicant: TRAENT S.R.L., Milan (IT)

(72) Inventors: Claudio Felicioli, Via Giuseppe Cesare Abba (IT); Massimo Cairo, Via Giuseppe di Vittorio (IT); Andrea Canciani, Via delle Medaglie d'oro (IT); Fabio Severino, Piazza Cairoll (IT)

(73) Assignee: TRAENT S.R.L. (IT)

( * ) Notice: Subject to any disclaimer, the term of this patent is extended or adjusted under 35 U.S.C. 154(b) by 0 days.

(21) Appl. No.: 18/869,397

(22) PCT Filed: May 29, 2023

(86) PCT No.: PCT/EP2023/064315
§ 371 (c)(1),
(2) Date: Nov. 26, 2024

(87) PCT Pub. No.: WO2023/232734
PCT Pub. Date: Dec. 7, 2023

(65) Prior Publication Data
US 2025/0370643 A1 Dec. 4, 2025

(30) Foreign Application Priority Data
May 30, 2022 (IT) ........................ 102022000011327

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
None
See application file for complete search history.

(56) References Cited

U.S. PATENT DOCUMENTS 5,469,562 A 11/1995 Saether
10,567,234 B1 2/2020 Todd
(Continued)

FOREIGN PATENT DOCUMENTS

CA 3208978 A1 7/2022
EP 3552343 B1 3/2022
(Continued)

OTHER PUBLICATIONS

Bernabe, et al., "Privacy-Preserving Solutions for Blockchain: Review and Challenges," XP011757453, IEEE Access, vol. 7, Oct. 28, 2019, pp. 164908-164940.
(Continued)

*Primary Examiner* — Richard L Bowen
(74) *Attorney, Agent, or Firm* — Bryan A. Santarelli; FisherBroyles, LLP

(57) ABSTRACT

A method includes storing a first data structure containing a first persistent sequence of first data blocks by appending them to a last one of the first data blocks and storing a second data structure containing a second persistent sequence of second data blocks by appending them to a last one of the second data blocks. For a selected first and second data block, generating the selected second data block including a second data content, generating the selected first data block by including a first data content and a digest of the selected second data block, and appending the selected first data block. For a further selected second data block following the selected second data block, generating the further selected second data block by including a third data content and a
(Continued)

further digest of the selected first data block, and appending the further selected second data block.

10 Claims, 9 Drawing Sheets

(56) References Cited

U.S. PATENT DOCUMENTS

| | | | | |
|---|---|---|---|---|
| 10,826,685 | B1 | 11/2020 | Campagna | |
| 10,868,674 | B2 | 12/2020 | Beecham | |
| 10,880,105 | B1 * | 12/2020 | Li | G06Q 40/12 |
| 11,501,315 | B2 | 11/2022 | Novotny | |
| 11,533,127 | B1 | 12/2022 | Yu | |
| 11,791,980 | B1 | 10/2023 | Kaddoura | |
| 12,184,784 | B2 | 12/2024 | McIver | |
| 12,541,802 | B2 | 2/2026 | Bawa | |
| 2018/0101844 | A1 | 4/2018 | Song | |
| 2018/0343111 | A1 | 11/2018 | Chen | |
| 2019/0079950 | A1 | 3/2019 | Ramabaja | |
| 2019/0104102 | A1 | 4/2019 | Khan | |
| 2019/0354443 | A1 | 11/2019 | Haustein | |
| 2020/0175207 | A1 | 6/2020 | Cheng | |
| 2020/0192335 | A1 * | 6/2020 | Takao | G05B 19/4183 |
| 2020/0210386 | A1 | 7/2020 | Quick | |
| 2020/0250747 | A1 | 8/2020 | Padmanabhan | |
| 2020/0349123 | A1 | 11/2020 | Irazabal | |
| 2020/0374105 | A1 | 11/2020 | Padmanabhan | |
| 2020/0374301 | A1 | 11/2020 | Manevich | |
| 2021/0258145 | A1 | 8/2021 | Sardesai | |
| 2021/0377037 | A1 | 12/2021 | Antonopoulos | |
| 2021/0406250 | A1 | 12/2021 | Novo Diaz | |
| 2022/0182375 | A1 | 6/2022 | Xu | |
| 2022/0358030 | A1 * | 11/2022 | Yanamala | G06F 16/27 |
| 2023/0030421 | A1 | 2/2023 | Werner | |
| 2023/0046315 | A1 | 2/2023 | Davies | |
| 2023/0131232 | A1 | 4/2023 | Ratnakaram | |

FOREIGN PATENT DOCUMENTS

| | | | |
|---|---|---|---|
| EP | 3849133 | B1 | 7/2022 |
| WO | 2019228560 | A2 | 12/2019 |
| WO | 2020041127 | A1 | 2/2020 |
| WO | 2023232733 | A1 | 12/2023 |
| WO | 2023232735 | A1 | 12/2023 |
| WO | 2023232736 | A1 | 12/2023 |
| WO | 2023232738 | A1 | 12/2023 |
| WO | 2023232739 | A1 | 12/2023 |
| WO | 2023232740 | A1 | 12/2023 |

OTHER PUBLICATIONS

De Meijer, Carlo R.W., "Blockchain Versus GDPR and Who Should Adjust Most," XP055719852, Oct. 9, 2018, Retrieved from https://www.finextra.com/blogposting/16102/blockchain-versus-gdpr-and-who-should-adjust-most; PCT International Search Report & Written Opinion mailed Aug. 24, 2023, 11 pgs.

International Search Report & Written Opinion mailed Aug. 14, 2023 for Application No. PCT/EP2023/064315, a counterpart application of U.S. Appl. No. 18/869,397, 12 pgs.

International Search Report & Written Opinion mailed Aug. 16, 2023 for Application No. PCT/EP2023/064317, a counterpart application of U.S. Appl. No. 18/869,553, 11 pgs.

International Search Report & Written Opinion mailed Aug. 18, 2023 for Application No. PCT/EP2023/064314, a counterpart application of U.S. Appl. No. 18/869,383, 8 pgs.

International Search Report & Written Opinion mailed Sep. 20, 2023 for Application No. PCT/EP2023/064324, a counterpart application of U.S. Appl. No. 18/869,570, 9 pgs.

International Search Report & Written Opinion mailed Aug. 24, 2023 for Application No. PCT/EP2023/064316, a counterpart application of U.S. Appl. No. 18/869,548, 9 pgs.

International Search Report & Written Opinion mailed Aug. 25, 2023 for Application No. PCT/EP2023/064322, a counterpart application of U.S. Appl. No. 18/869,556, 10 pgs.

International Search Report & Written Opinion mailed Aug. 30, 2023 for Application No. PCT/EP2023/064323, a counterpart application of U.S. Appl. No. 18/869,562, 11 pgs.

Politou, et al., "Blockchain Mutability: Challenges and Proposed Solutions," XP081442719, Cornell University Library, arxiv. org, IEEE, Jul. 16, 2019, pp. 1-13.

Tanner, et al., "Technology Review of Blockchain Data Privacy Solutions," XP081957719, Cornell University Library, arxiv. org, IEEE, May 4, 2021, pp. 1-60.

Non-Final Office Action mailed Mar. 16, 2026 for U.S. Appl. No. 18/869,548, a corresponding application, 12 pgs.

Non-Final Office Action mailed Apr. 22, 2026 for U.S. Appl. No. 18/869,556, a corresponding application, 6 pgs.

Notice of Allowance mailed Apr. 16, 2026 for U.S. Appl. No. 18/869,553, a corresponding application, 13 pgs.

Non-Final Office Action mailed Jan. 15, 2026 for U.S. Appl. No. 18/869,562, a corresponding application, 12 pgs.

Notice of Allowance mailed Jan. 16, 2026 for U.S. Appl. No. 18/869,570, a corresponding application, 14 pgs.

Final Office Action mailed Jul. 7, 2026 for U.S. Appl. No. 18/869,548, a corresponding application, 14 pgs.

Notice of Allowance mailed Jun. 4, 2026 for U.S. Appl. No. 18/869,553, a corresponding application, 11 pgs.

Notice of Allowance mailed Jul. 28, 2026 for U.S. Appl. No. 18/869,562, a corresponding application, 10 pgs.

* cited by examiner

CRYPTOGRAPHY-BASED TIME RELATIONSHIPS IN AND BETWEEN VERIFIABLE PERSISTENT LEDGER STRUCTURES

CROSS-REFERENCE TO RELATED APPLICATIONS

This application is a national phase filing of international application No. PCT/EP2023/064315, entitled "CRYPTOGRAPHY-BASED TIME RELATIONSHIPS IN AND BETWEEN VERIFIABLE PERSISTENT LEDGER STRUCTURES", filed May 29, 2023, which claims the benefit of priority from Italian patent application No. 102022000011327 filed May 30, 2022, both of which are incorporated herein by reference.

BACKGROUND OF THE PRESENT INVENTION

Field of the Present Invention

The present disclosure relates to the information technology field. More specifically, this disclosure relates to the storing of data.

Overview of the Related Art

Storing of data (e.g., logs, documents, transactions) is a commonplace activity in most computing systems (for example, for their preservation, outputting, further processing and so on).

For this reason, it is known to store data in suitable data structures, such as ledger-like data structures wherein the storing of data is persistent, i.e., data structures in which it should not be possible to remove the data therefrom once they have been stored.

In some applications, it is desirable to be capable of assessing the time and/or the order in which the data have been stored in the data structures.

According to a solution known in the art, one or more timing authorities may be employed to apply timestamps when data is being stored in a data structure. By considering a ledger-like data structure in which data are stored in form of data blocks, every time a new data block comprising new data is generated, a timestamp generated by a timing authority may be added to said data block.

In this way, by strictly associating each data block with a corresponding timestamp, it is possible to keep track of the order in which the data blocks have been stored, as well as to precisely determine the time in which each data block has been stored.

US 2020/349123 A1 discloses an operation that may include one or more of generating, by a block generator, modified blocks for source ledgers, receiving a merge request to merge a plurality of source ledgers into a merged ledger, identifying the plurality of source ledgers, generating a genesis block from modified blocks of the identified source ledgers, ordering blocks, by a committer node or peer, in the merged ledger based on the genesis block, and validating a block order in the merged ledger.

WO 2019/228560 A2 discloses methods, systems, and apparatus, including computer programs encoded on computer storage media, for managing blockchain-based centralized ledger systems. One of the methods includes: maintaining multiple blockchains and a centralized trust timestamp blockchain in a centralized ledger system, each of the blockchains including a plurality of blocks storing transaction data, the timestamp blockchain including a plurality of timestamp blocks storing trust timestamp information of an independent trust time server for the blockchains, receiving timestamp requests for to-be-timestamped blocks in the blockchains, each of the timestamp requests including information of a respective to-be-timestamped block, receiving a timestamp and associated signature of the trust time server for the to-be-timestamped blocks from the trust time server, and storing information of the timestamp and the associated signature of the trust time server and the information of the to-be-timestamped blocks in a timestamp block of the timestamp blockchain.

US 2019/079950 A1 discloses systems and methods of providing immutable records, and immutable ordering of records, in a computing system. The computing system can be a member of a blockchain network of a plurality of blockchains. Each block can include a cryptographic digest (or hash) conforming to a minimum degree of difficulty, a nonce by which the cryptographic digest was generated in conformation with the degree of difficulty, and a list of cryptographic digests of most recent blocks of participating neighbor blockchains. Blocks may be passed between blockchains of the plurality of blockchains, which enables each member of the blockchain network to verify an immutable record of data transactions free of the mutual trust requirement of a typical blockchain environment. In conjunction with the generation of each block, an event record may be entered into an event log of the computing system wherein the block was generated. The event record, which may contain actionable instructions, requests, etc., may be transmitted to computing systems of participating neighbor blockchains, where actionable items may be acted upon. Further, the event logs of each computing system may be exchanged, compared, and adjusted to reflect the earliest appearance of each block of each participating neighbor blockchain.

SUMMARY OF THE PRESENT INVENTION

Applicant has found that the solutions known in the art providing for using timing authorities for the generation of timestamps to be added to all the blocks of data structures are not satisfactory.

Indeed, having to ask a timing authority for the generation of a timestamp each time a new data block of a data structure is generated, and the addition of the timestamp to the new data block, is quite costly in terms of computational resources.

Moreover, using a timing authority for timing the data blocks of a data structure poses problems in terms of trust, since the resulting timing of the data blocks is entirely determined by a single timing authority, and therefore it is necessary that said timing authority has a very high level of trustworthiness.

In view of the above, Applicant has devised a solution for timing data blocks that is not affected by the abovementioned drawbacks.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present that applies mutatis mutandis to any other aspect thereof).

In general terms, the solutions according to embodiments of the present invention provide for a cryptography-based time order relationship between data blocks of at least two different ledgers, wherein said cryptography-based time order relationship is established by generating a data block of one of said at least two ledgers which includes a digest of a data block of another one of said at least two ledgers.

Particularly, an aspect of the present invention relates to a method for timing data blocks.

The method comprises storing a first data structure containing a first persistent sequence of first ones of the data blocks by appending each of the first data blocks to a last one of the first data blocks of the first persistent sequence.

The method further comprises storing a second data structure containing a second persistent sequence of second ones of the data blocks by appending each of the second data blocks to a last one of the second data blocks of the second persistent sequence.

For a pair of a selected one of the first data blocks and a selected one of the second data blocks, the method comprises:

- generating the selected second data block including a second data content;
- generating the selected first data block by including a first data content and a digest of the selected one of the second data blocks, and
- appending the selected first data block thereby defining a time order relationship in which the generation of the second data blocks up the selected second data block temporally precedes the generation of the selected first data block.

In this way, a time order relationship can be advantageously established among data blocks of different data structures without having to involve any timestamping authority.

Using a digest as a mean for establishing a timing link between the two data structures is very cost effective in terms of consumed computational resources.

For a further selected one of the second data blocks following the selected second data block in the second persistent sequence, the method further comprises: generating the further selected second data block by including a third data content and a further digest of the selected first data block.

The method further comprises appending the further selected second data block thereby defining a further time order relationship in which the generation of the second data blocks starting from the further selected second data block temporally follows the generation of the selected first data block.

In this way, the selected first data block can be advantageously used as a synchronization point between the two data structures, with the second persistent sequence of data blocks that is subdivided in two parts, i.e., one part comprising second data blocks the generation thereof temporally precedes the generation of the selected first data block, and another part comprising second data blocks the generation thereof temporally follows the generation of the selected first data block.

According to an embodiment of the present invention, the method comprises searching the first data structure for the selected first data block including the digest of the selected second data block.

According to an embodiment of the present invention, the method comprises, in response to a finding of the selected first data block, determining that the second data blocks of the second persistent sequence up to the selected second data block have been generated before the selected first data block.

According to an embodiment of the present invention, the method comprises searching the second data structure for the further selected second data block including the further digest of the selected first data block.

According to an embodiment of the present invention, the method comprises, in response to a finding of the further selected second data block, further determining that the second data blocks of the second persistent sequence starting from the further selected second data block have been generated after the selected first data block.

According to an embodiment of the present invention, said generating the selected first data block further comprises timestamping said first data block with a corresponding timestamp.

According to an embodiment of the present invention, the method further comprises determining that the second data blocks of the second persistent sequence up to the selected second data block have been generated at a time occurring before a time corresponding to the timestamp.

According to an embodiment of the present invention, the method further comprises determining that the second data blocks of the second persistent sequence starting from the further selected second data block have been generated at a time occurring after a time corresponding to the timestamp.

In this way, even if the second data blocks of the second persistent sequence do not have timestamps, the timestamping carried out on the first data blocks of the first persistent sequence can be at least partially extended to the second data blocks of the second persistent sequence.

According to an embodiment of the present invention, each first data block of the first persistent sequence different from an initial first data block of the first persistent sequence comprises a digest of the previous first data block in the first persistent sequence.

According to an embodiment of the present invention, each second data block of the second persistent sequence different from an initial second data block of the second persistent sequence comprises a digest of the previous second data block in the second persistent sequence.

According to an embodiment of the present invention, the method further comprises generating said digest of a data block and/or said further digest of a data block by applying a cryptographic hash function to said data block.

In this way, the time order relationship established between the two data structures is particularly safe and reliable.

Another aspect of the present invention relates to a computer program configured for causing a computing system to perform the method of above when the computer program is executed on the computing system.

Another aspect of the present invention relates to a corresponding computer program product, the computer program product comprising one or more computer readable storage media having program instructions collectively stored on the readable storage media, the program instructions being readable by a computing system to cause the computing system to perform the same method.

Another aspect of the present invention relates to a computing system comprising means configured for performing the method above.

Another aspect of the present invention relates to a computing system comprising a circuitry for performing each step of the method above.

BRIEF DESCRIPTION OF THE DRAWINGS

These and other features and advantages of the present invention will appear more clearly by reading the following detailed description of exemplary and non-limitative embodiments thereof. For its better intelligibility, the following description should be read making reference to the attached drawing, wherein.

DETAILED DESCRIPTION OF EXEMPLARY AND NON-LIMITATIVE EMBODIMENTS OF THE PRESENT INVENTION

Figure 1:
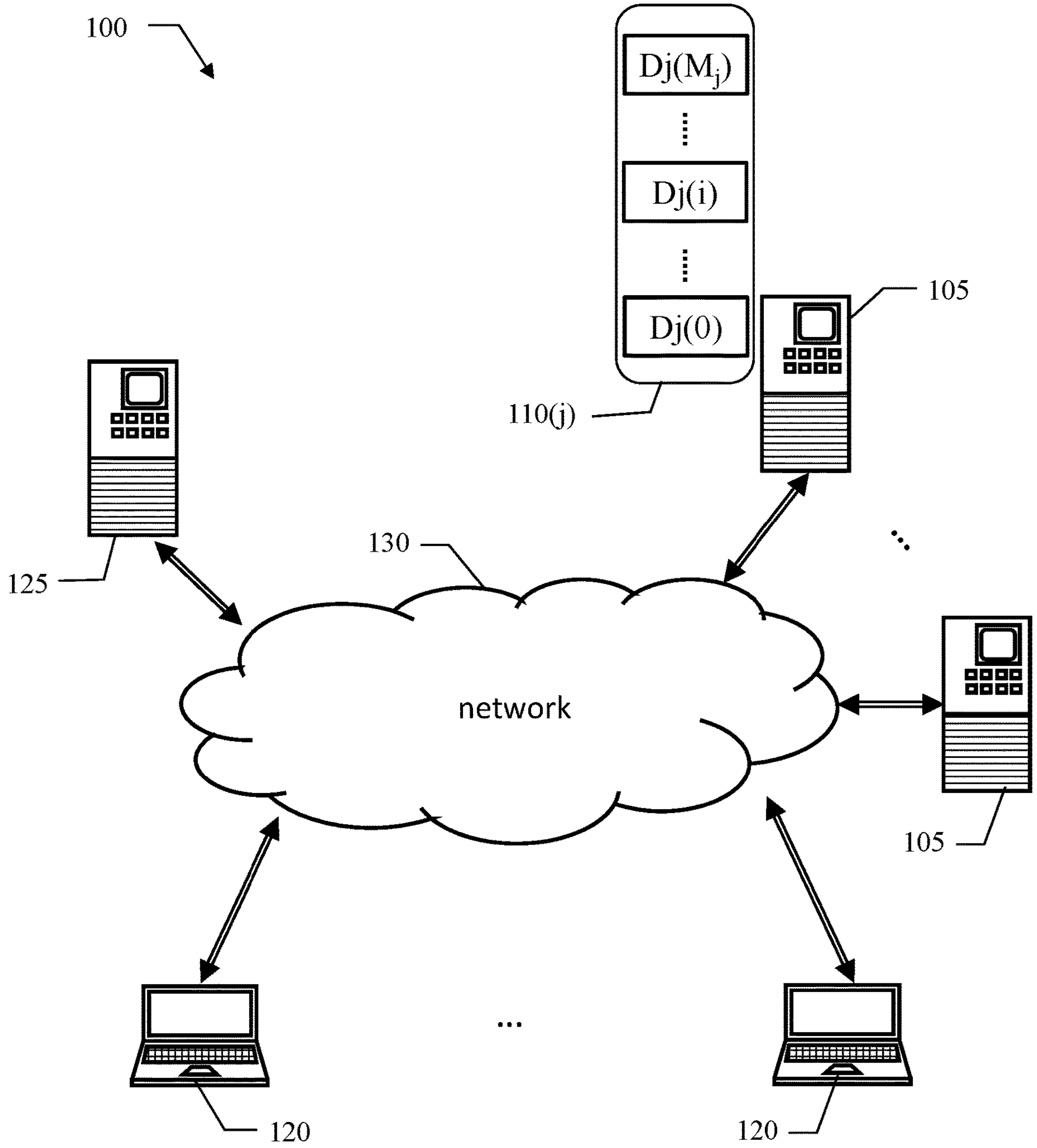
FIG. 1 is a schematic block diagram of an information technology infrastructure that may be used to implement the solution according to embodiments of the present invention.

With reference to the drawings, FIG. 1 is a schematic block diagram of an information technology infrastructure 100 that may be used to implement the solution according to embodiments of the present invention.

The infrastructure 100 comprises one or more storage computing systems, or simply storage nodes, 105 configured to store generic data (e.g., logs, documents, transactions). The data are stored into one or more data structures, or simply ledgers 110(*j*) (only one illustrated in the figure). Each ledger 110(*j*) stores the corresponding data into data blocks Dj(i) (i=0, 1, . . . , $M_j$). The data blocks Dj(i) are arranged in a (chronological) sequence defined by their appending to the ledger 110(*j*) (in the considered example, from data block Dj(0) to data block Dj($M_j$)). The data blocks Dj(i) may only be added in succession by appending them to an end of the corresponding ledger 110(*j*). Each data block Dj(i) of the sequence of data blocks Dj(i) of a ledger 110(*j*)—apart from an initial data block Dj(0) thereof—is linked to the immediately preceding data block Dj(i−1) in the sequence by storing a digest of said data block Dj(i−1). The ledger 110(*j*) accumulates the data that are never removed from the ledger 110(*j*) once they have been added therein (with any updates of the data that preserve all previous versions of the same data). In other words, the data are stored in each ledger 110(*j*) according to a persistence sequence of data blocks Dj(i).

The infrastructure 100 further comprises one or more client computing systems, or simply clients, 120. The clients 120 are used to access the data stored in the storage nodes 105 by (authorized) users thereof and/or to verify the consistency of the data stored in the storage nodes 105 by auditors.

Optionally, the infrastructure 100 may further comprise one or more timing authority systems 125 (only one illustrated). A timing authority system 125 may be exploited to timestamp data blocks Dj(i) of the ledgers 110(*j*).

The storage nodes 105, the clients 120 and the timing authority systems 125 communicate among them over a (telecommunication) network 130, such as for example the Internet.

Figure 2:
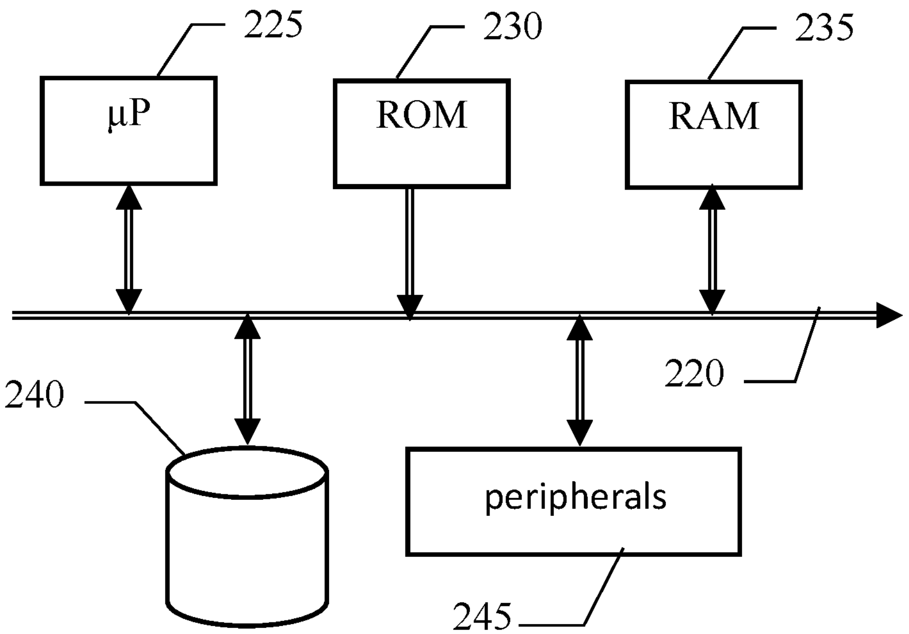
FIG. 2 shows an example of modules included in computing systems of the information technology infrastructure of FIG. 1.

Passing now to FIG. 2, each of the above-described computing systems (storage nodes 105, clients 120, timing authority systems 125) comprises several units that are connected among them through a bus structure 220 at one or more levels (with an architecture that is suitably scaled according to the type of the computing system 105, 120, 125). Particularly, a microprocessor (μP) 225, or more, provides a logic capability of the computing system computing system 105, 120, 125; a non-volatile memory (ROM) 230 stores basic code for a bootstrap of the computing system 105, 120, 125 and a volatile memory (RAM) 235 is used as a working memory by the microprocessor 225. The computing system 105, 120, 125 is provided with a mass-memory 240 for storing programs and data (for example, storage devices of a data center wherein each computing system 105, 125 is implemented and a Solid State Disk, or SSD, for each computing system 120 (i.e., client)). Moreover, the computing system 105, 120, 125 comprises a number of controllers for peripherals, or Input/Output (I/O) units, 245; for example, the peripherals 245 of each computing system 105, 125 comprise a network adapter for plugging the computing system 105, 125 into a corresponding data center and then connecting it to a console of the data center for its control (for example, a personal computer, also provided with a drive for reading/writing removable storage units, such as of USB type) and to a switch/router subsystem of the data center for its communication with the network 130, whereas the peripherals 245 of each computing system 120 (i.e., client), comprise a keyboard, a mouse, a monitor, a network adapter for connecting to the network 130 and a drive for reading/writing removable storage units (such as of USB type).

The solutions according to embodiments of the present invention provide for a cryptography-based time order relationship between data blocks of at least two different ledgers 110(*j*), wherein said cryptography-based time order relationship is established by generating a data block of one of said at least two ledgers 110(*j*) which includes a digest of a data block of another one of said at least two ledgers.

Figure 3A:
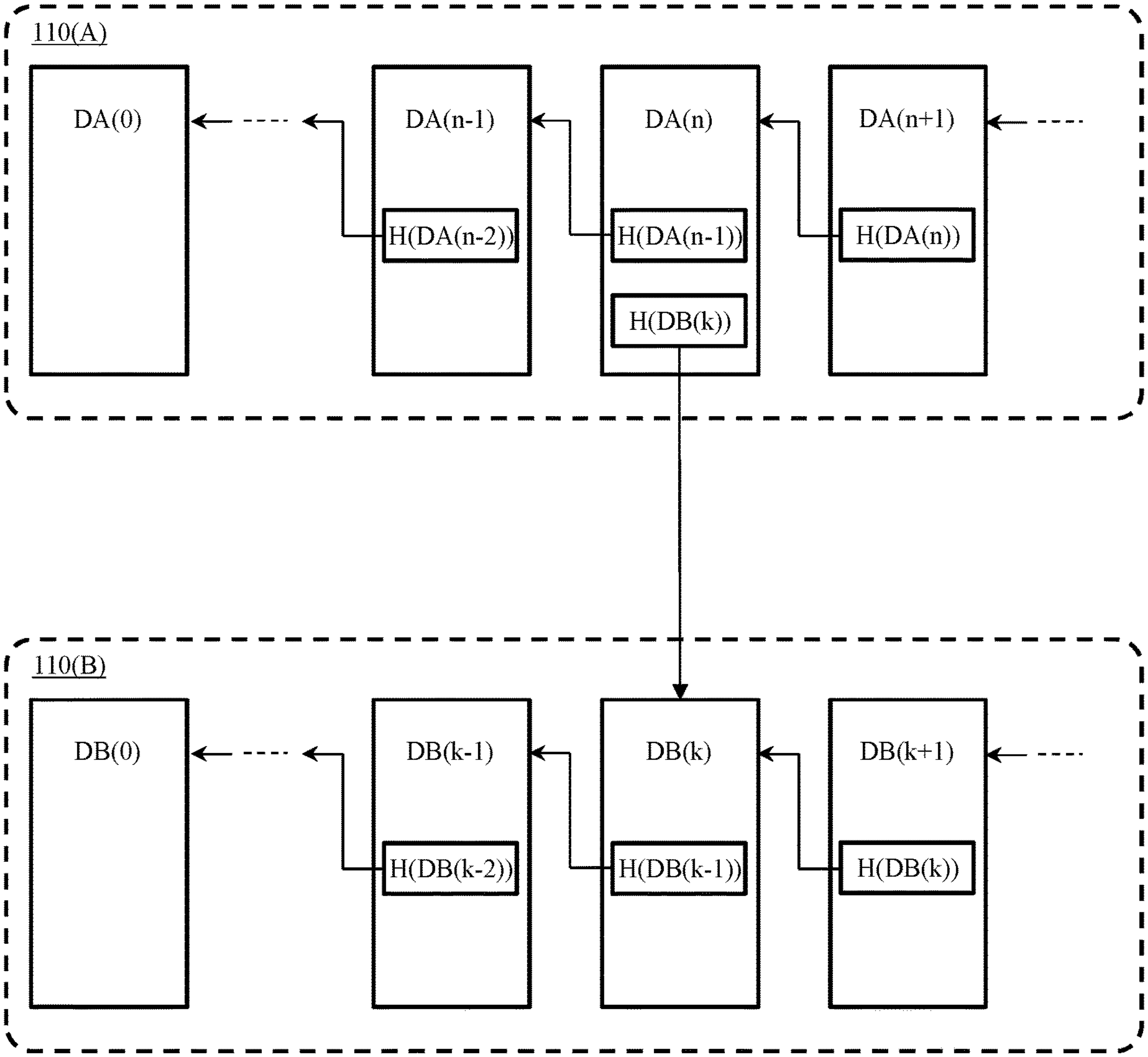
FIGS. 3A-3C show general principles of a data block timing according to embodiments of the present invention.

According to an embodiment of the present invention illustrated in FIG. 3A, two different ledgers 110(*j*) are provided, and namely a first ledger 110(*j*=A) and a second ledger 110(*j*=B).

According to an embodiment of the present invention, each data block DA(n) of the sequence of data blocks DA(n) of the ledger 110(A) stores a corresponding data content. Moreover, according to an embodiment of the invention, each data block DA(n) of the sequence of data blocks DA(n) of the ledger 110(A)—apart from the initial data block DA(0)—is linked to the immediately preceding data block DA(n−1) in the sequence by storing a digest H(DA(n−1)) of said data block DA(n−1) in the data block DA(n) when the data block DA(n) is being appended to the data block DA(n−1).

According to an embodiment of the invention, the digest H(DA(n)) of a generic data block DA(n) is calculated by applying a cryptographic hash function to said data block DA(n). By cryptographic hash function it is herein intended a one-way function configured to output a hash value for which it is infeasible to reverse the process that generate the given hash value, it is infeasible to find two inputs with the same hash value, and for which a small change to the input should change the hash value to a large extent, so that the resulting changed hash value appears uncorrelated to the previous hash value.

For example, according to an embodiment of the present invention, the digests H(DA(n)) are calculated using the SHA-256 or the SHA-512 cryptographic hash functions.

However, the concepts of the present invention directly apply in case a different cryptographic hash function is employed.

Similarly, according to an embodiment of the present invention, each data block DB(k) of the sequence of data blocks DB(k) of the ledger 110(B) stores a corresponding data content. Moreover, according to an embodiment of the present invention, each data block DB(k) of the sequence of data blocks DB(k) of the ledger 110(B)—apart from the initial data block DB(0)—is linked to the immediately preceding data block DB(k−1) in the sequence by storing a digest H(DB(k−1)) of said data block DB(k−1) in the data block DB(k) when said data block DB(k) is being appended to the data block DB(k−1).

In the same way as for the digest H(DA(n)), the digest H(DB(k)) of a generic data block DB(k) is calculated by applying a cryptographic hash function to said data block DB(k).

According to an embodiment of the present invention, a selected data block DA(n) of the ledger 110(A) is generated by including—in addition to its data content and to the digest H(DA(n−1)) of the preceding data block DA(n−1)—also a digest H(DB(k)) of a selected data block DB(k) of the ledger 110(B).

In this way, once the selected data block DA(n) has been appended to the ledger 110(A) and the selected data block DB(k) has been appended to the ledger 110(B), by inspecting (e.g., during an auditing phase carried out through a client 120) the two ledgers 110(A), 110(B) it is possible to determine that the data block DB(k) has been generated before the data block DA(n) has been generated. Moreover, since the data blocks DB(0), DB(1), . . . , DB(k−1) preceding the data block DB(k) have been appended to the sequence of data blocks of the ledger 110(B), it is also possible to determine that said data blocks DB(0), DB(1), . . . , DB(k−1) as well have been generated before the data block DA(n) has been generated.

Therefore, according to this embodiment of the invention, a time order relationship is established between the ledger 110(A) and the ledger 110(B) in which the generation of the data blocks DB(0), . . . , DB(k) of the sequence of data blocks of the ledger 110(B) temporally precedes the generation of the data block DA(n) of the sequence of data blocks of the ledger 110(A).

Advantageously, the time order relationship according to this embodiment of the present invention is established without having to involve any timestamping authority.

Moreover, since the time order relationship according to this embodiment of the present invention is based on a cryptographic function (for the calculation of the digest H(DB(k))), said time order relationship is particularly safe and reliable.

Using the digest H(DB(k)) as a timing link between the ledger 110(A) and the ledger 110(B) is also very cost effective in terms of consumed computational resources, since it simply requires the calculation of the digest trough the application of a hash function.

According to an embodiment of the present invention, said selected data block DB(k) may be a data block that is already appended to the ledger 110(B) when the selected data clock DA(n) is generated. For example, said selected data block DB(k) may be the last data block DB(k) of the ledger 110(B)—i.e., the most recent data block DB(k) of the ledger 110(B) that has been appended in the sequence of data blocks DB(k).

According to another embodiment of the present invention, said selected data block DB(k) may instead be appended later, such as for example even after that the selected data block DA(n) of the ledger 110(A) is being appended to the immediately preceding data block DA(n−1).

According to another embodiment of the present invention illustrated in FIG. 3B, a stronger time order relationship between the ledgers 110(A), 110(B) is established in the following way.

As in the embodiment of the invention illustrated in FIG. 3A, a selected data block DA(n) of the ledger 110(A) is generated by including—in addition to its data content and to the digest H(DA(n−1)) of the preceding data block DA(n−1)—also a digest H(DB(k)) of a selected data block DB(k) of the ledger 110(B).

Additionally, according to an embodiment of the present invention, a further selected data block DB(k+1) following the data block DB(k) in the sequence of data blocks of the ledger 110(B) is generated by including—in addition to its data content and to the digest H(DB(k)) of the preceding data block DB(k)—also a digest H(DA(n)) of the selected data block DA(n) of the ledger 110(A).

In this way, once the selected data block DA(n) has been appended to the ledger 110(A) and the selected data block DB(k) and the further selected data block DB(k+1) have been appended to the ledger 110(B), by inspecting (e.g., during an auditing phase carried out through a client 120) the two ledgers 110(A), 110(B) it is also possible to determine that the data block DB(k+1) has been generated after the data block data block DA(n) has been generated. Moreover, since the data blocks DB(k+1), DB(k+2), . . . following the data block DB(k) have been appended in the sequence of data blocks of the ledger 110(B) after data block DB(k), it is also possible to determine that said data blocks DB(k+1), DB(k+2), . . . as well have been generated after the data block DA(n) has been generated.

Therefore, according to this embodiment of the invention, a time order relationship is established between the ledger 110(A) and the ledger 110(B) in which:

- the generation of the data blocks DB(0), . . . , DB(k) of the sequence of data blocks of the ledger 110(B) temporally precedes the generation of the data block DA(n) of the sequence of data blocks of the ledger 110(A), and
- the generation of the data blocks DB(k+1), DB(k+2), . . . of the sequence of data blocks of the ledger 110(B) temporally follows the generation of the data block DA(n) of the sequence of data blocks of the ledger 110(A).

In other words, according to an embodiment of the present invention, the data block DA(n) can be advantageously used as a synchronization point (from the chronological point of view) between the ledgers 110(A) and 110(B), in which the sequence of data blocks of the ledger 110(B) is subdivided in two parts, i.e., one part comprising data blocks DB(0), . . . , DB(k) the generation thereof temporally precedes the generation of the data block DA(n), and one part comprising data blocks DB(k+1), DB(k+2), . . . the generation thereof temporally follows the generation of the data block DA(n).

Figure 3B:
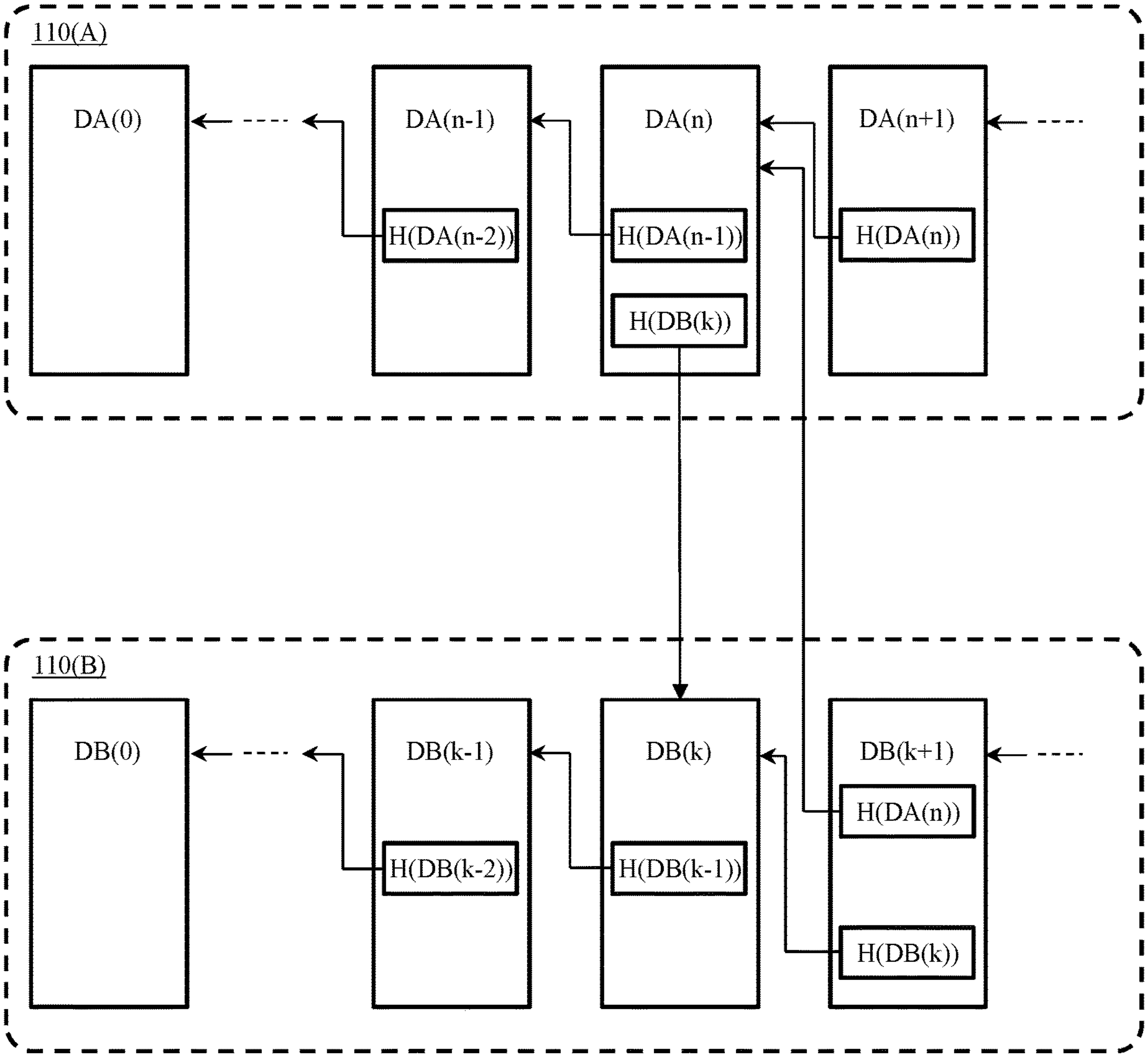

Although in the exemplary embodiment of the invention illustrated in FIG. 3B the digest H(DA(n)) has been included in the data block DB(k+1) that immediately follows the data block DB(k), the concepts of the invention may be directly applied to the case in which the digest H(DA(n)) is instead included in a data block of the ledger 110(B) that follows also the data block DB(k+1) (e.g., the data block DB(k+p), with p>1).

The time order relationship between the ledger 110(A) and the ledger 110(B) established according to the embodiments of the invention described above can be further improved in case the data blocks of the ledger 110(A) are timestamped at their generation. For example, the data blocks of the ledger 110(A) can be timestamped through one of the timing authority systems 125 illustrated in FIG. 1. However, similar considerations apply in case the timestamping of the data blocks of the ledger 110(A) are directly carried out by (e.g., at least one of) the storage nodes 105 storing the ledger 110(A).

Figure 3C:
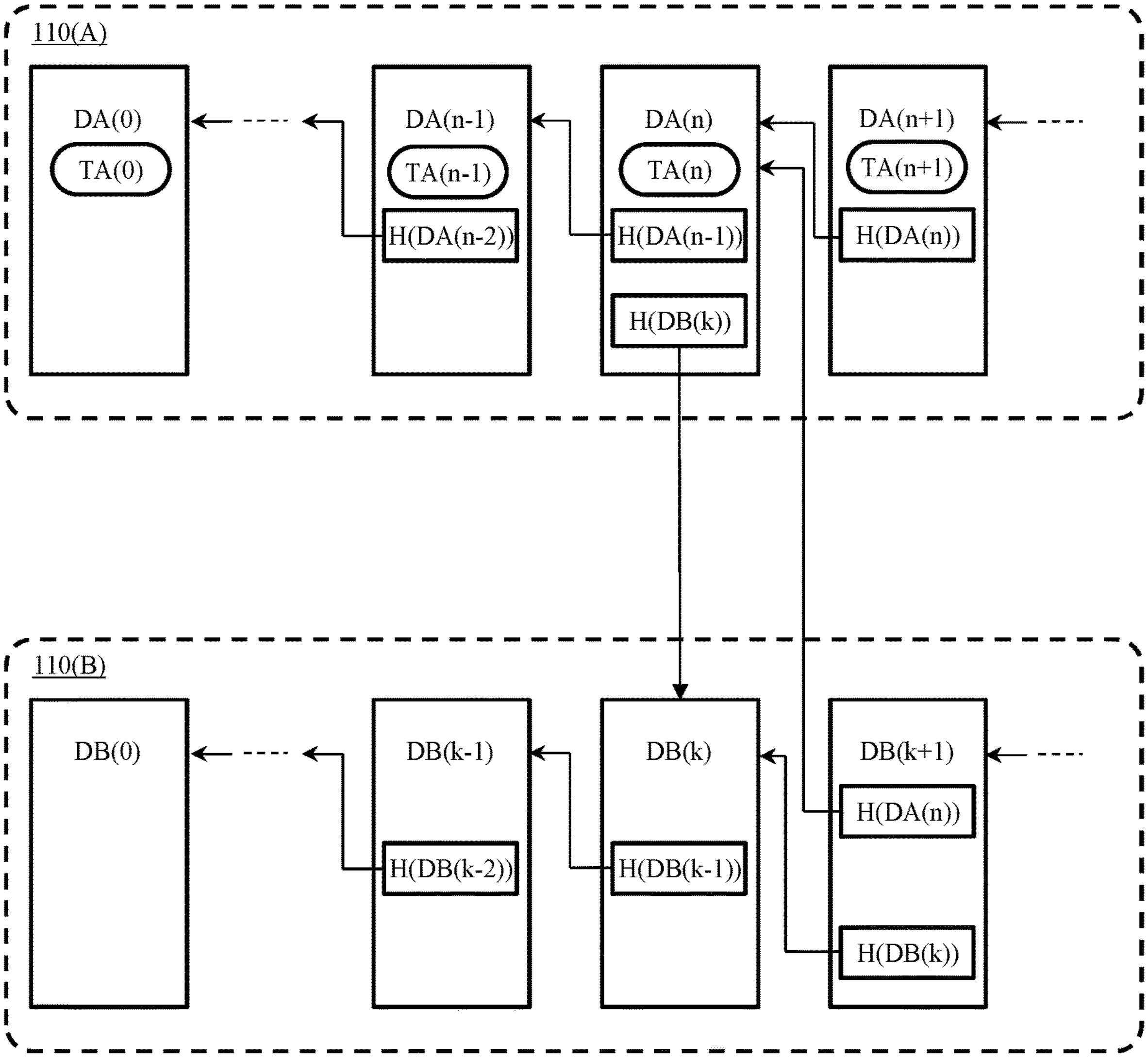

By making reference to FIG. 3C, according to an embodiment of the present invention, the data blocks of the ledger 110(A) are timestamped so as that each data block DA(n) of the ledger 110(A) stores a corresponding timestamp TA(n) indicative of a time t in which the data block DA(n) has been generated. Moreover, according to the embodiment of the invention illustrated in FIG. 3C, the data block DA(n) is used as a synchronization point between the ledgers 110(A), 110(B) in the same way as for the embodiments of the invention corresponding to FIG. 3B (i.e., with the data block DA(n) that stores the digest H(DB(k)) and the data block DB(k+1) that stores the digest H(DA(n)).

In this way, by inspecting (e.g., during an auditing phase carried out through a client 120) the two ledgers 110(A), 110(B) it is also possible to determine that:

- the generation of the data blocks DB(0), . . . , DB(k) of the sequence of data blocks of the ledger 110(B) temporally precedes the time t indicated by the timestamp TA(n) stored in the data block DA(n), and
- the generation of the data blocks DB(k+1), DB(k+2), . . . of the sequence of data blocks of the ledger 110(B) temporally follows the time t indicated by the timestamp TA(n) stored in the data block DA(n).

In other words, according to the embodiment of the invention illustrated in FIG. 3C, even if the data blocks of the ledger 110(B) do not have timestamps, the timestamping carried out on the data blocks of the ledger 110(A) can be at least partially extended to the data blocks of the ledger 110(B) through the time order relationship between the ledgers 110(A), 110(B) established by using the data block DA(n) as a synchronization point.

In this way, it is advantageously possible to determine an at least partial timing of the data blocks of a ledger 110(B) without being forced to directly timestamp said data blocks, reducing the costs in terms of computational resources.

Although the embodiment of the invention illustrated in FIG. 3C makes reference to the case in which the data block DA(n) is used as a synchronization point between the ledgers 110(A), 110(B) as in the embodiment of the invention corresponding to FIG. 3B (i.e., with the data block DA(n) that stores the digest H(DB(k)) and the data block DB(k+1) that stores the digest H(DA(n)), the concepts of the present invention can be directly applied to the case in which the data block DA(n) is used as a synchronization point between the ledgers 110(A), 110(B) as in the embodiment of the invention corresponding to FIG. 3A (i.e., with only the data block DA(n) that stores the digest H(DB(k))). In this latter case, by inspecting the two ledgers 110(A), 110(B) it is only possible to determine that the generation of the data blocks DB(0), . . . , DB(k) of the sequence of data blocks of the ledger 110(B) temporally precedes the time t indicated by the timestamp TA(n) stored in the data block DA(n).

Moreover, even if in the embodiment of the invention illustrated in FIG. 3C each data block DA(0), DA(1), . . . of the ledger 110(A) stores a corresponding timestamp TA(0), TA(1), . . . , the concepts of the present invention can be applied as well to the cases in which only a subset of the data blocks of the ledger 110(A) stores a corresponding timestamp, for example including the data block DA(n) used as a synchronization point between the ledgers 110(A), 110(B).

The concepts of the present invention can be also applied to the case in which the data blocks of both the ledgers 110(A), 110(B) are timestamped through two different timing authority systems 125, e.g., when the data blocks DA(n) of the ledger 110(A) are timestamped with timestamps TA(n) generated by a timing authority system 125 and the data blocks DB(k) of the ledger 110(B) are timestamped with timestamps TB(k) generated by a different timing authority system 125. In this case, by exploiting the time order relationship between the ledgers 110(A), 110(B) established by using the data block DA(n) as a synchronization point (as already described with reference to FIGS. 3A-3C), it is advantageously possible to verify (e.g., during an auditing phase carried out through a client 120) a time coherence between the timestamps TA(n) of the data blocks DA(n) of the ledger 110(A) and the timestamps TB(k) of the data blocks DB(k) of the ledger 110(B).

This is particularly advantageous in case the trustworthiness of the timing authority system 125 generating the timestamps TB(k) for the data blocks DB(k) of the ledger 110(B) is lower than the trustworthiness of the timing authority system 125 generating the timestamps TA(n) for the data blocks DA(n) of the ledger 110(A), since in this case it is possible to use the timestamps TA(n) of the ledger 110(A) as a time reference for the timestamps TB(k) of the ledger 110(B).

It is pointed out that although in the embodiments of the invention described up to now only a single synchronization point between the ledgers 110(A), 110(B) is established (through the data block DA(n) storing the digest H(DB(k))), the concepts of the present invention can be directly applied to cases in which a plurality of synchronization points between the ledgers 110(A), 110(B) are established through a plurality of different data blocks DA(n) of the ledger 110(A). In this way, a more precise time order relationship may be defined between the ledgers 110(A), 110(B), with the ledgers 110(A), 110(B) that are subdivided in an ordered sequence of more than two parts (defined by said plurality of synchronization points).

Moreover, even if the embodiments of the invention described up to now only entail a time order relationship between two ledgers 110(A), 110(B), the concepts of the present invention can be directly applied to cases in which more than two different ledgers are involved.

For example, a data block of a first ledger can be used as a synchronization point with a second ledger and a third ledger (in this case, a digest of a data block of the second ledger and a digest of a data block of the third ledger are stored in said data block of the first ledger).

As another example, a data block of a first ledger can be used as a synchronization point with a second ledger (with a digest of a data block of the second ledger that is stored in said block of the first ledger) and a further data block of the second ledger can be used as a synchronization point with a third ledger (with a digest of a data block of the third ledger that is stored in said further data block of the second ledger).

Figure 4:
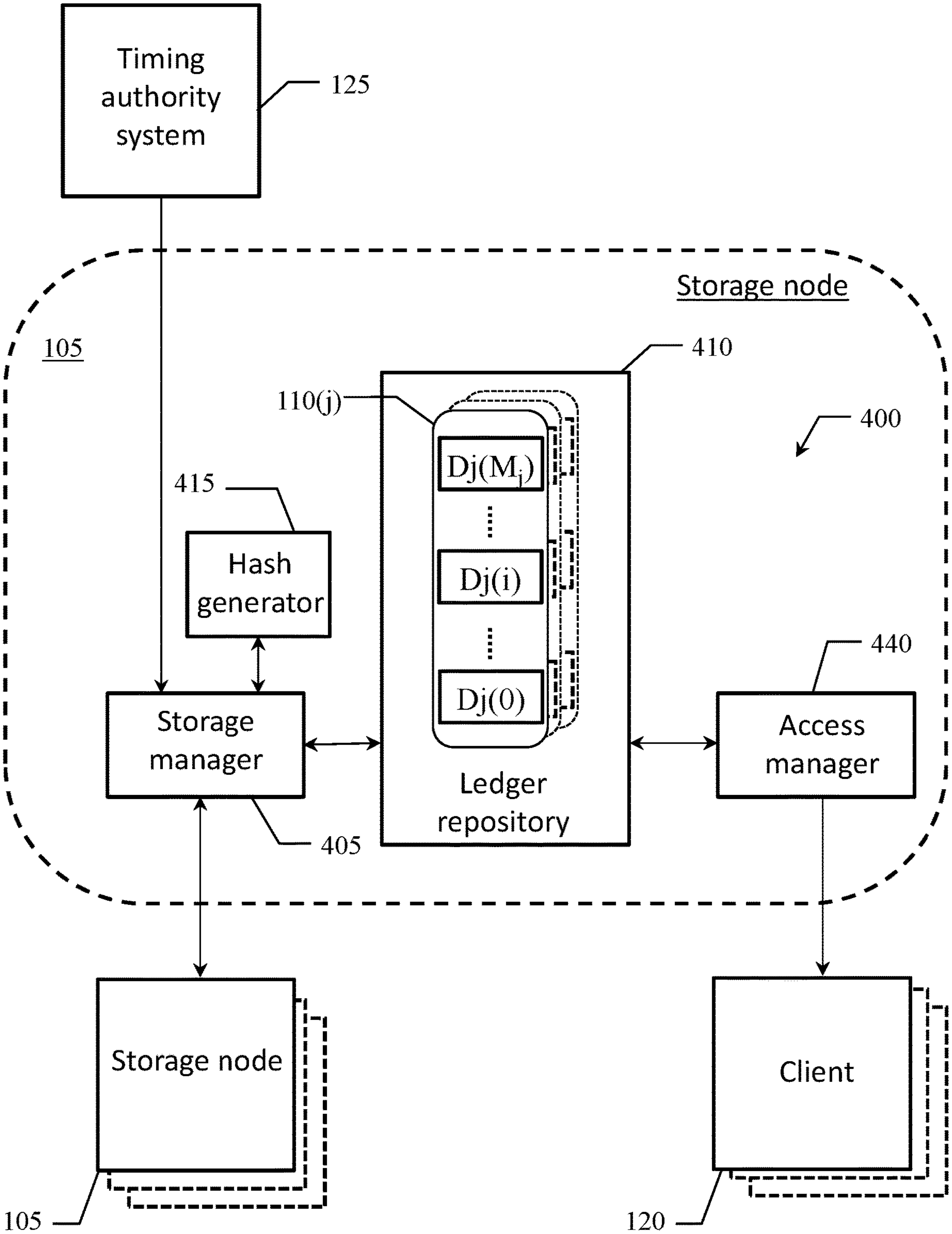
FIG. 4 shows main software components that may be used by storage nodes of the information technology infrastructure of FIG. 1 to implement the data block timing of FIGS. 3A-3C according to embodiments of the present invention.

With reference now to FIG. 4, the main software components are shown that may be used by each storage node 105 to implement the solution according to an embodiment of the present disclosure.

Particularly, all the software components (programs and data) are denoted as a whole with the reference 400. The software components are typically stored in the mass memory and loaded (at least partially) into the working memory of the storage node 105 when the programs are running, together with an operating system and other application programs not directly relevant to the solution of the present disclosure (thus omitted in the figure for the sake of simplicity). The programs are initially installed into the mass memory, for example, from removable storage units or from the network. In this respect, each program may be a module, segment or portion of code, which comprises one or more executable instructions for implementing the specified logical function.

The software components 400 comprise a storage manager 405 configured to manage the storing of data in ledgers 110(*j*) under the control of the storage node 105. The storage manager 405 is configured to read/write a ledger repository 410 that contains the data blocks Dj(i) of the ledgers 110(*j*) under the control of the storage node 105 as well as metadata information regarding said ledgers 110(*j*).

For example, the ledger repository 410 has an entry for each ledger 110(*j*). The entry corresponding to a ledger 110(*j*) stores a header comprising a (unique) identifier of the ledger 110(*j*), an author list of one or more digital certificates of entities being authorized to write the ledger (authors), and a possible peer list of one or more other (peer) storage nodes 105 with which the ledger 110(*j*) is shared (for example, identified by their host names). The entry corresponding to a ledger 110(*j*) further stores the data blocks Dj(i) of said ledger 110(*j*) in form of a sequence of one or more records, wherein each record contains a data block Dj(i) being appended to the ledger 110(*j*).

A hash generator 415 is configured to interact with the storage manager 405 for calculating the digests H(Dj(i)) of the data blocks Dj(i).

The storage manager 405 may be configured to interact with one or more timing authority systems 125 for receiving timestamps to be stored in the data blocks Dj(i) being appended to the ledgers 110(*j*). Alternatively, or additionally, the storage manager 405 may be also configured to directly generate the timestamps by itself.

The storage manager 405 is configured to interact with the other storage nodes 105.

An access manager 440 manages the access to the data stored in the storage node 105. The access manager 440 is configured to read the ledger repository 410 and provide information extracted from selected one or more ledgers 110(*j*) stored in the ledger repository 410 to a (user/auditor managing a) client 120.

Figure 5A:
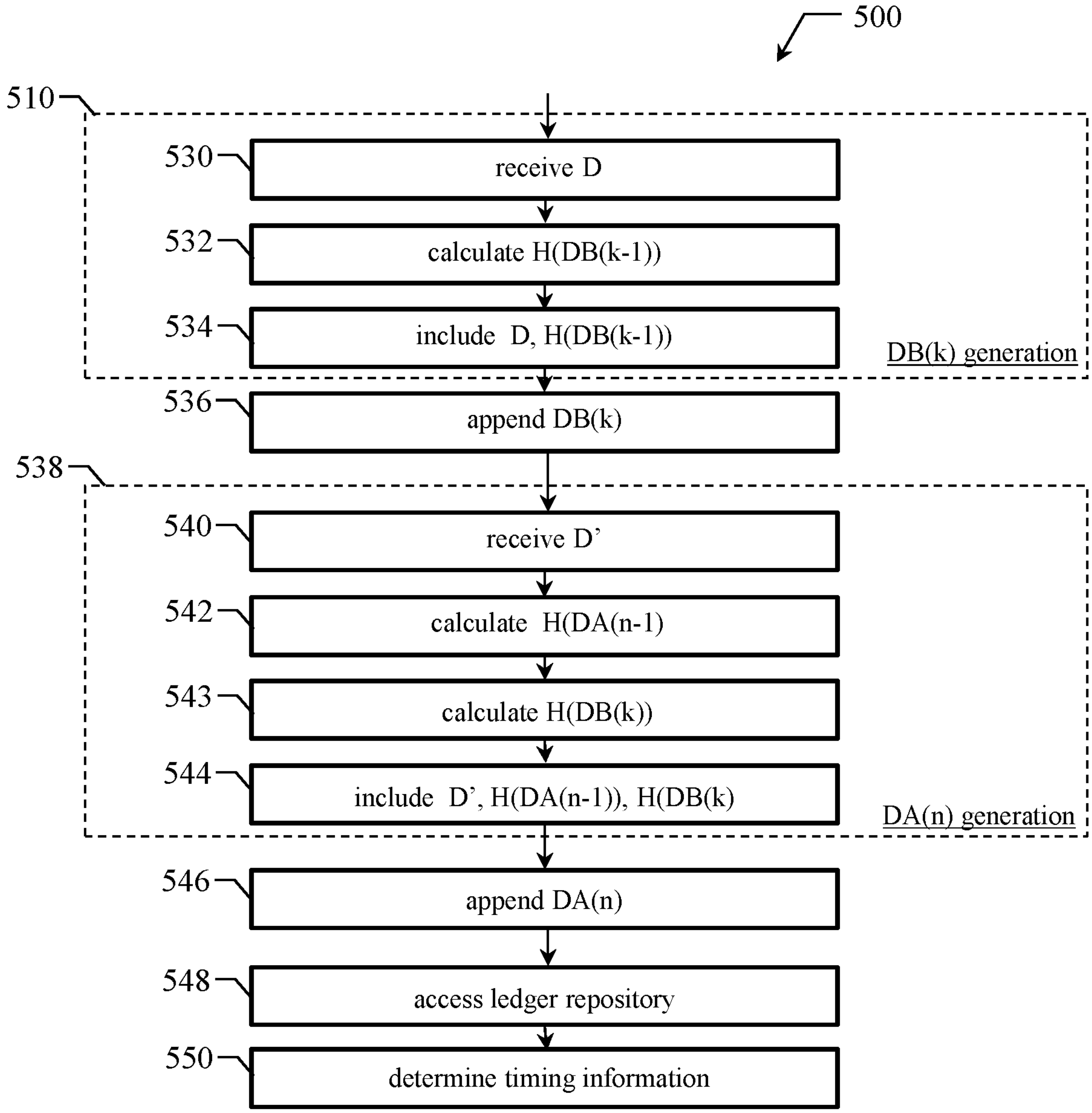
FIGS. 5A-5C illustrates flow charts describing an example of operations for implementing the data blocks timing of FIGS. 3A-3C, respectively, according to embodiments of the present invention.

With reference to FIG. 5A, a flow chart 500 is shown describing an example of the operations carried out by software components 400 of one or more storage nodes 105 and by a client 120 interacting with said storage nodes 105 for implementing the data blocks timing illustrated in FIG. 3A according to an embodiment of the present invention.

A first generation phase (identified with reference 510) regards the operations carried out for generating the data block DB(k) of the ledger 110(B) of FIG. 3A.

According to an embodiment of the present invention, phase 510 comprises the following subphases 530-534.

The storage manager 405 of a storage node 105 receives data D to be stored in the data block DB(k) of the ledger 110(B) (subphase 530).

Then, the hash generator 415 computes the digest H(DB(k−1)) of the previous data block DB(k−1) of the ledger 110(B), by applying a cryptographic hash function to said data block DB(k−1) (subphase 532).

The storage manager 405 includes the received data D and the digest H(DB(k−1)) into the data block DB(k) (subphase 534).

Once the data block DB(k) comprising the received data D and the digest H(DB(k−1)) has been generated, the storage manager 405 appends said data block DB(k) to the ledger 110(B) by adding a new record to the ledger 110(B) in the ledger repository 410 (phase 536).

A second generation phase (identified with reference 538) regards the operations carried out for generating the data block DA(n) of the ledger 110(A) of FIG. 3A. According to an embodiment of the present invention, phase 538 comprises the following subphases 540-544.

The storage manager 405 of a storage node 105 receives data D' to be stored in the data block DA(n) of the ledger 110(A) (subphase 540).

Then, the hash generator 415 computes the digest H(DA(n−1)) of the previous data block DA(n−1) of the ledger 110(A), by applying a cryptographic hash function to said data block DA(n−1) (subphase 542).

The hash generator 415 further computes the digest H(DB(k)) of the data block DB(k) of the ledger 110(B) that has been generated during phase 510 (subphase 543).

The storage manager 405 includes the received data D', the digest H(DA(n−1)), and the digest H(DB(k)) into the data block DA(n) (subphase 544).

Once the data block DA(n) comprising the received data D' and the digests H(DA(n−1)), H(DB(k)) has been generated, the storage manager 405 appends said data block DA(n) to the ledger 110(A) by adding a new record to the ledger 110(A) in the ledger repository 410 (phase 546).

According to an embodiment of the present invention, the phase 510 (for the generation of the data block DB(k) of the ledger 110(B)) and the phase 538 (for the generation of the data block DA(n) of the ledger 110(A)) may be carried out by (software components 400 of) a same storage node 105 or by (software components 400 of) two different storage nodes 105. The phase 510 is carried out before phase 538.

Although in the considered example phase 536 for appending the data block DB(k) to the ledger 110(B) is carried out immediately after phase 510 for generating the data block DB(k) and phase 546 for appending the data block DA(n) to the ledger is carried out immediately after phase 538 for generating the data block DA(n), similar considerations apply in case the appending phases 536 and 546 are both carried out after the phase 538. Moreover, the appending phase 536 may be also carried out after the appending phase 546.

According to an embodiment of the present invention, a user of a client 120 wanting to collect timing information about the data blocks of the ledgers 110(A), 110(B) (for example, during an auditing phase), may access the ledger repository 410 of the storage node 105 through its access manager 440, and then search the ledger 110(A) for a data block DA(n) thereof storing a digest H(DB(k)) of the ledger 110(B) (phase 548).

In response to the finding of the data block DA(n) of the ledger 110(A) storing the digest H(DB(k)) of the data block DB(k), the user of the client 120 can therefore determine—as already described above in reference to FIG. 3A—that the data blocks DB(0), DB(1), . . . , DB(k) have been generated before the data block DA(n) has been generated (phase 550).

Figure 5B:
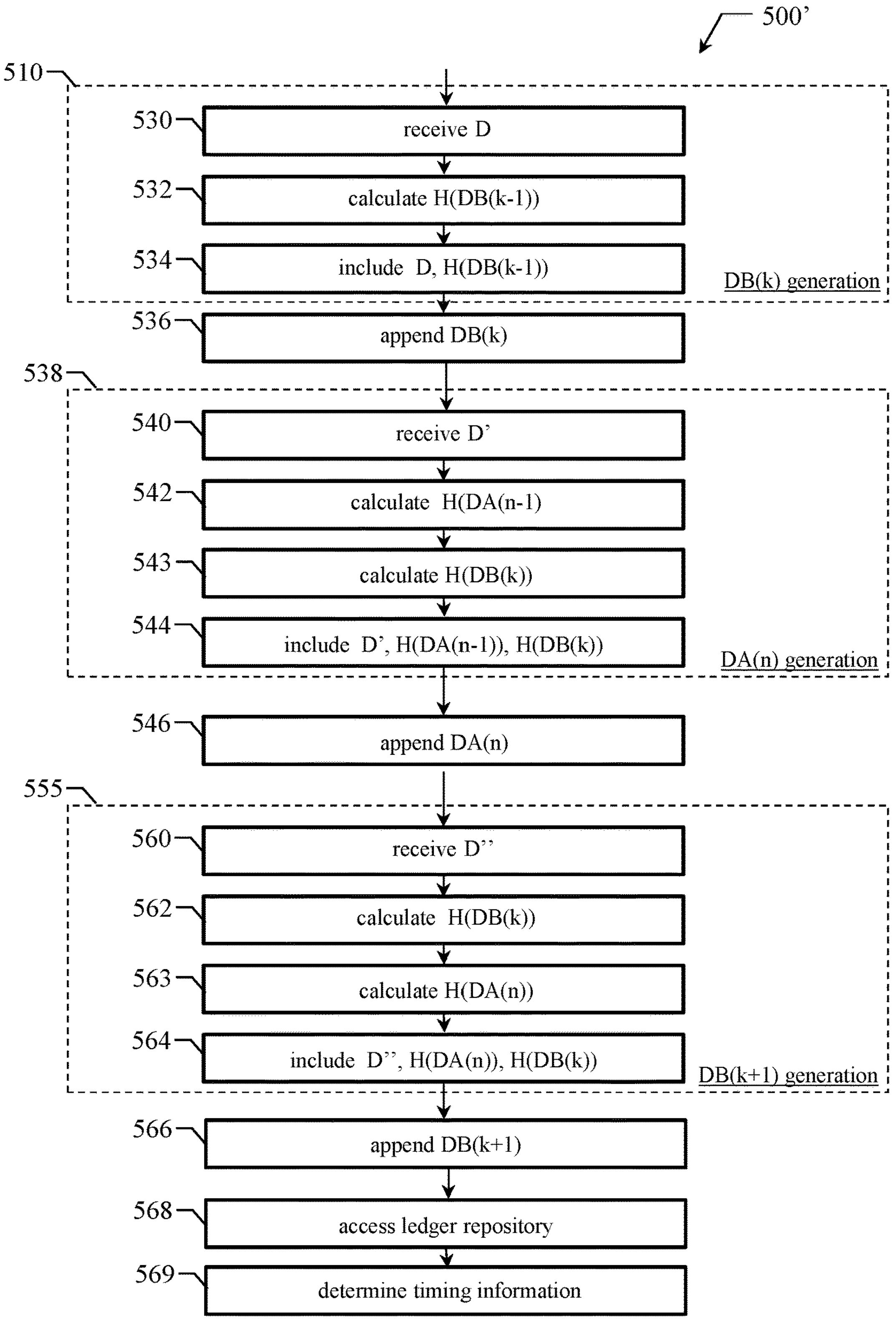

With reference to FIG. 5B, a flow chart 500' is shown describing an example of the operations carried out by software components 400 of one or more storage nodes 105 and by a client 120 interacting with said storage nodes 105 for implementing the data blocks timing illustrated in FIG. 3B according to an embodiment of the present invention.

The phases/subphases corresponding to operations already described with reference to FIG. 5A will be identified with the same references and their detailed description will be omitted for the sake of brevity.

Like in the flow chart 500 described with reference to FIG. 5A, a first generation phase 510 is carried out for generating the data block DB(k), followed by a phase 536 providing for appending the generated data block DB(k) to the ledger 110(B), and then a second generation phase 538 is carried out for generating the data block DA(n), followed by a phase 546 providing for appending the generated data block DA(n) to the ledger 110(A), with the generated data block DA(n) that stores the digest H(DB(k)) of the data block DB(k) of the ledger 110(B).

Then, a third generation phase (identified with reference 555) is carried out regarding the operations carried out for generating the data block DB(k+1) of the ledger 110(B) of FIG. 3B.

According to an embodiment of the present invention, phase 555 comprises the following subphases 560-564.

The storage manager 405 of a storage node 105 receives data D" to be stored in the data block DB(k+1) of the ledger 110(B) (subphase 560).

Then, the hash generator 415 computes the digest H(DB(k)) of the previous data block DB(k) of the ledger 110(B), by applying a cryptographic hash function to said data block DB(k) (subphase 562).

The hash generator 415 further computes the digest H(DA(n)) of the data block DA(n) of the ledger 110(A) that has been generated during phase 520 (subphase 563).

The storage manager 405 includes the received data D", the digest H(DA(n)), and the digest H(DB(k)) into the data block DB(k+1) (subphase 564).

Once the data block DB(k+1) comprising the received data D" and the digests H(DA(n)), H(DB(k)) has been generated, the storage manager 405 appends said data block DB(k+1) to the ledger 110(B) by adding a new record to the ledger 110(B) in the ledger repository 410 (phase 566).

According to an embodiment of the present invention, a user of a client 120 wanting to collect timing information about the data blocks of the ledgers 110(A), 110(B) (for example, during an auditing phase), may access the ledger repository 410 of the storage node 105 through its access manager 440, and then search the ledger 110(A) for a data block DA(n) thereof storing a digest H(DB(k)) of the ledger 110(B) and the ledger 110(B) for a data block DB(k+1) storing a digest H(DA(n)) of said data block DA(n) (phase 568).

In response to the finding of the data block DA(n) of the ledger 110(A) storing the digest H(DB(k)) of the data block DB(k), and of the data block DB(k+1) of the ledger 110(B) storing a digest H(DA(n)) of said data block DA(n), the user of the client 120 can therefore determine—as already described above in reference to FIG. 3B—that the data blocks DB(0), DB(1), . . . , DB(k) have been generated before the data block DA(n) has been generated, and that the data blocks DB(k+1), DB(k+2), . . . , have been generated after the data block DA(n) has been generated (phase 569).

Figure 5C:
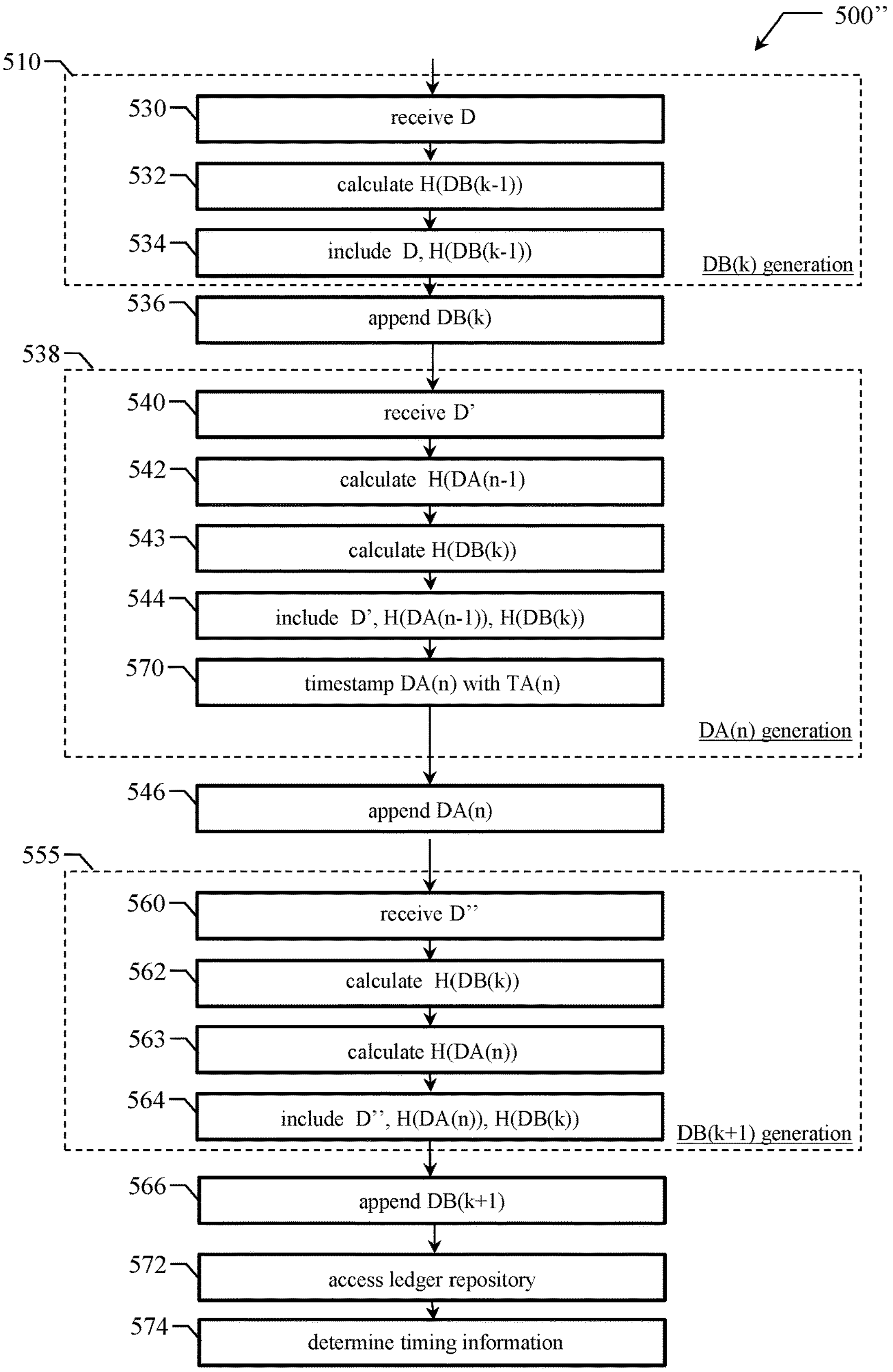

With reference to FIG. 5C, a flow chart 500" is shown describing an example of the operations carried out by software components 400 of one or more storage nodes 105 and by a client 120 and a timing authority system 125 interacting with said storage nodes 105 for implementing the data blocks timing illustrated in FIG. 3C according to an embodiment of the present invention.

The phases/subphases corresponding to operations already described with reference to FIG. 5A and/or FIG. 5B will be identified with the same references and their detailed description will be omitted for the sake of brevity.

Like in the flow chart 500' described with reference to FIG. 5B, a first generation phase 510 is carried out for generating the data block DB(k), followed by a phase 536 providing for appending the generated data block DB(k) to the ledger 110(B), a second generation phase 538 is carried out for generating the data block DA(n), followed by a phase 546 providing for appending the generated data block DA(n) to the ledger 110(A), with the generated data block DA(n) that stores the digest H(DB(k)) of the data block DB(k), and a third generation phase 555 is carried out for generating the data block DB(k+1), followed by a phase 566 providing for appending the generated data block DB(k+1) to the ledger 110(B), with the generated data block DB(k+1) that stores the digest H(DA(n)) of the data block DA(n).

According to an embodiment of the present invention, phase 538 further provides for having the storage manager 405 timestamp the generated data block DA(n) with a corresponding timestamp TA(n) (subphase 570). For example, the timestamp TA(n) may be generated by a timing authority system 125 interacting with the storage manager 405 of the storage node 105. Alternatively, the timestamp TA(n) may be directly generated by the storage manager 405 itself.

According to an embodiment of the present invention, a user of a client 120 wanting to collect timing information about the data blocks of the ledgers 110(A), 110(B) (for example, during an auditing phase), may access the ledger repository 410 of the storage node 105 through its access manager 440, and then search the ledger 110(A) for a data block DA(n) thereof storing a digest H(DB(k)) of the ledger 110(B) and the ledger 110(B) for a data block DB(k+1) storing a digest H(DA(n)) of said data block DA(n) (phase 572).

In response to the finding of the data block DA(n) of the ledger 110(A) storing the digest H(DB(k)) of the data block DB(k), and of the data block DB(k+1) of the ledger 110(B) storing a digest H(DA(n)) of said data block DA(n), and by identifying the timestamp TA(n) of the data block DA(n), the user of the client 120 can therefore determine—as already described above in reference to FIG. 3C—that the data blocks DB(0), DB(1), . . . , DB(k) have been generated before a time t corresponding to the timestamp TA(n), and that the data blocks DB(k+1), DB(k+2), . . . , have been generated after said time t corresponding to the timestamp TA(n) (phase 574).

Another aspect of the present invention relates to a computer program configured for causing a computing system (one or more of the storage nodes 105) to perform the method described above when the computer program is executed on the computing system.

Another aspect of the present invention relates to a corresponding computer program product, the computer program product comprising one or more computer readable storage media having program instructions collectively stored on the readable storage media, the program instructions readable by one or more computing systems (one or more of the storage nodes 105) to cause the computing system to perform the same method.

Generally, the computer program may be implemented as a stand-alone module, as a plug-in for a pre-existing software program (for example, a storage manager and a storage client, respectively, or even directly in the latter). It would be readily apparent that it is also possible to deploy the same solution as a service that is accessed through a network (such as in the Internet). Similar consideration apply if the program is structured in a different way, or if additional modules or functions are provided; likewise, the memory structures may be of other types, or may be replaced with equivalent entities (not necessarily consisting of physical storage media). The program may take any form suitable to be used by any computing system (comprising one or more of the storage nodes 105), thereby configuring the computing system to perform the desired operations; particularly, the program may be in the form of external or resident software, firmware, or microcode (either in object code or in source code), for example, to be compiled or interpreted. Moreover, it is possible to provide the program on any computer readable storage medium. The storage medium is any tangible medium (different from transitory signals per se) that may retain and store instructions for use by the computing system. For example, the storage medium may be of the electronic, magnetic, optical, electromagnetic, infrared, or semiconductor type; examples of such storage medium are fixed disks (where the program may be pre-loaded), removable disks, memory keys (for example, USB), and the like. The program may be downloaded to the computing system from the storage medium or via a network (for example, the Internet, a wide area network and/or a local area network comprising transmission cables, optical fibers, wireless connections, network devices); one or more network adapters in the computing system receive the program from the network and forward it for storage into one or more storage devices of the computing system. In any case, the solution according to an embodiment of the present invention lends itself to be implemented even with a hardware structure (for example, by electronic circuits integrated on one or more chips of semiconductor material), or with a combination of software and hardware suitably programmed or otherwise configured.

An embodiment provides a storage computing system (comprising one or more storage nodes 105) comprising a circuitry (i.e., any hardware suitably configured, for example, by software) for performing each step of the method described above. However, the storage computing system may be of any type (for example, implemented by a physical machine, a virtual machine, a cloud service and so on).

Generally, similar considerations apply if the storage computing system and the whole system has a different structure, comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

The invention claimed is:

1. A method for timing data blocks, wherein the method comprises:

storing a first data structure containing a first persistent sequence of first ones of the data blocks by appending each of the first data blocks to a last one of the first data blocks of the first persistent sequence;

storing a second data structure containing a second persistent sequence of second ones of the data blocks by appending each of the second data blocks to a last one of the second data blocks of the second persistent sequence, wherein, for a pair of a selected one of the first data blocks and a selected one of the second data blocks, the method comprises:

generating the selected second data block including a second data content;

generating the selected first data block by including a first data content and a digest of the selected one of the second data blocks, and appending the selected first data block thereby defining a time order relationship in which the generation of the second data blocks up the selected second data block temporally precedes the generation of the selected first data block, and wherein, for a further selected one of the second data blocks following the selected second data block in the second persistent sequence, the method further comprises:

generating the further selected second data block by including a third data content and a further digest of the selected first data block, and appending the further selected second data block thereby defining a further time order relationship in which the generation of the second data blocks starting from the further selected second data block temporally follows the generation of the selected first data block.

2. The method of claim 1, comprising:

searching the first data structure for the selected first data block including the digest of the selected second data block;

in response to a finding of the selected first data block, determining that the second data blocks of the second persistent sequence up to the selected second data block have been generated before the selected first data block.

3. The method of claim 1, comprising:

searching the second data structure for the further selected second data block including the further digest of the selected first data block;

in response to a finding of the further selected second data block, further determining that the second data blocks of the second persistent sequence starting from the further selected second data block have been generated after the selected first data block.

4. The method of claim 1, wherein said generating the selected first data block further comprises timestamping said first data block with a corresponding timestamp.

5. The method of claim 4, comprising:

determining that the second data blocks of the second persistent sequence up to the selected second data block have been generated at a time occurring before a time corresponding to the timestamp.

6. The method of claim 4, comprising:

determining that the second data blocks of the second persistent sequence starting from the further selected second data block have been generated at a time occurring after a time corresponding to the timestamp.

7. The method of claim 1, wherein:

each first data block of the first persistent sequence different from an initial first data block of the first persistent sequence comprises a digest of the previous first data block in the first persistent sequence;

each second data block of the second persistent sequence different from an initial second data block of the second persistent sequence comprises a digest of the previous second data block in the second persistent sequence.

8. The method of claim 1, further comprising generating said digest of a data block and/or generating said further digest of a data block by applying a cryptographic hash function to said data block.

9. A computer program product comprising one or more computer readable storage media having program instructions collectively stored on the readable storage media, the program instructions being readable by a computing system to cause the computing system to perform the method according to claim 1.

10. A computing system comprising a circuitry for performing each step of the method according to claim 1.

* * * * *